United States Patent [19]

Schachner

[11] 4,282,959

[45] Aug. 11, 1981

[54] AUTOMATIC CLUTCH

[75] Inventor: Julian Schachner, Chicago, Ill.

[73] Assignee: Borg-Warner Corporation, Chicago, Ill.

[21] Appl. No.: 72,508

[22] Filed: Sep. 4, 1979

[51] Int. Cl.³ .................... F16D 11/04; B60K 17/34
[52] U.S. Cl. .............................. 192/35; 192/67 R; 192/94
[58] Field of Search ............. 192/35, 36, 67 R, 93 A, 192/94

[56] References Cited

U.S. PATENT DOCUMENTS

| | | | |
|---|---|---|---|
| 1,459,578 | 6/1923 | Densmore | 192/94 X |
| 3,158,244 | 11/1964 | Lanigan, Jr. et al. | 192/94 X |
| 3,217,847 | 11/1965 | Petrak | 192/93 A X |
| 3,442,361 | 5/1969 | Hegar | 192/94 X |
| 4,192,411 | 3/1980 | Fogelberg | 192/67 R X |

*Primary Examiner*—Allan D. Herrmann
*Attorney, Agent, or Firm*—Julian Schachner

[57] ABSTRACT

A clutch for automatically engaging a driving member with a driven member upon application of torque to rotate the driving member in either direction, for maintaining engagement in either the drive or coast mode of operation and during the transition between drive and coast, for maintaining engagement in either the forward or reverse mode of operation, and for disengaging automatically upon interruption of the torque and slight rotation in the opposite direction.

8 Claims, 1 Drawing Figure

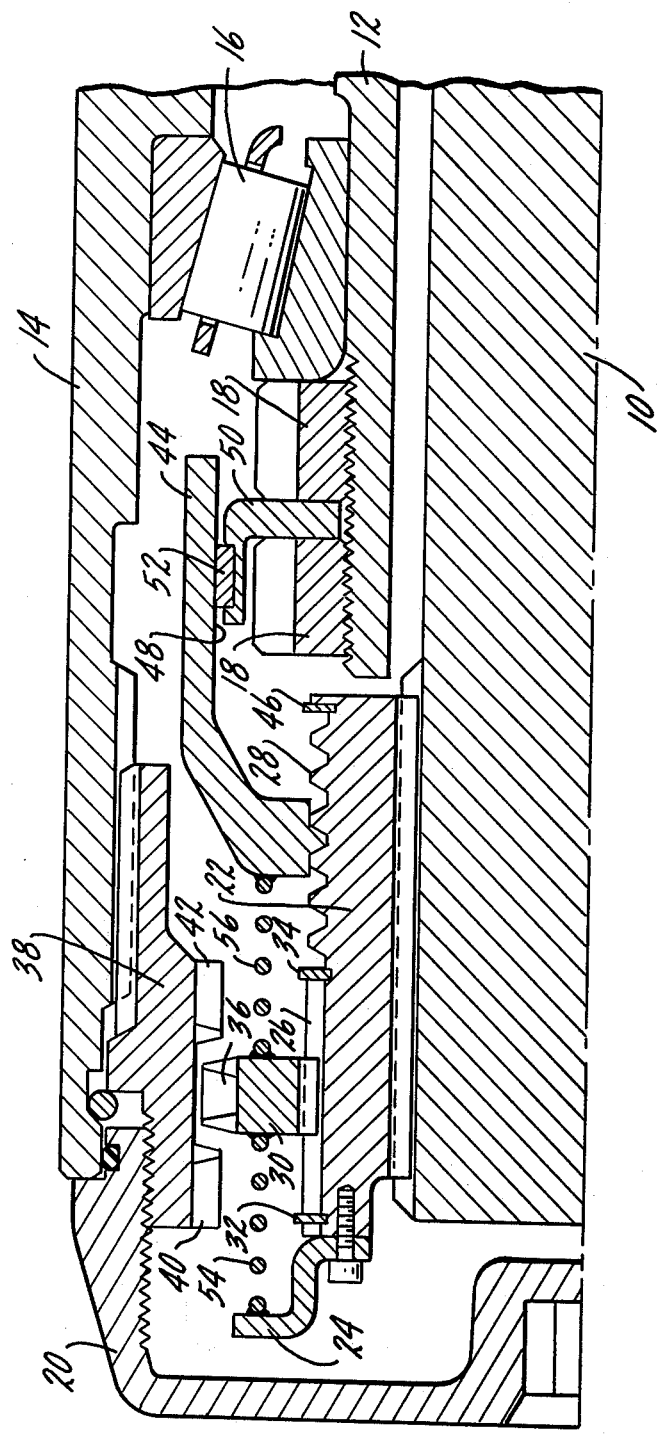

AUTOMATIC CLUTCH

BACKGROUND OF THE INVENTION

This invention relates generally to clutches. More particularly, it relates to a clutch for use in effecting locking engagement between a drive axle and a wheel of a four-wheel drive vehicle upon the application of power to the drive axle. The clutch automatically effects disengagement upon cessation of the application of power to the drive axle, together with a direction reversal.

Heretofore, various mechanisms have been used for engaging a drive axle with its associated wheels in a four-wheel drive vehicle. One such mechanism in the form of a wheel hub normally is disengaged to allow the wheel to rotate independently of the axle. This requires that the operator lock a pair of hubs manually to engage the drive axle and wheels, and to unlock them manually to disengage.

Another such mechanism provides an overrunning clutch which engages automatically when power is applied to the drive axle and when operation is in the drive mode. However, such an overrunning clutch inherently disengages upon operation in the coast mode. In other words, the overrunning clutch engages when the rotational speed of the axle tends to exceed the rotational speed of the wheel, but disengages when the rotational speed of the wheel tends to exceed that of the axle. Such an overrunning clutch generally provides some means by which the operator may override manually to insure locking engagement between the axle and wheel.

Yet another such mechanism provides a clutch which operates in response to the application of power to the drive axle by moving pins into slots so as to engage the axle with its associated wheel. Although a mechanism of this type will effect engagement in either the drive or coast mode of operation, there is the possibility that the pins could slip out of the slots during movement between the drive and coast modes, in which case the clutch would disengage and then re-engage automatically. At normal operating speeds such disengagement and re-engagement could cause severe shocks to the clutch components and, indeed, to the entire driveline. This would result in a dangerous and possibly destructive condition. Further, in a float condition wherein the axle is rotating but no torque is transferred between the axle and wheel, an inadvertent tendency for movement between the drive and coast modes could develop. This also could cause the clutch to disengage and then re-engage, thus establishing the same dangerous condition.

U.S. Pat. No. 4,192,411, issued Mar. 11, 1980, is directed to an automatic clutch which overcomes the deficiencies of the prior mechanisms. As disclosed therein, the clutch automatically engages a drive axle and an associated wheel upon engagement of a four-wheel drive system, maintains engagement positively in the drive and coast modes of operation as well as during the transition between drive and coast, maintains engagement positively in the forward and reverse modes of operation as well as during the transition between forward and reverse, and disengages automatically upon a slight direction reversal when the four-wheel drive system is disengaged.

A deficiency of this clutch is that it includes a ring which develops frictional drag sufficiently high to effect clutch engagement. Thereafter, this high drag continues even though it is not required to maintain clutch engagement. Thus, in order to conserve power, reduce heat, ease the problems of material selection, etc., there was still a need for an automatic clutch of this type which would develop relatively high frictional drag initially to effect automatic clutch engagement, and would develop relatively low frictional drag thereafter.

U.S. applications Ser. Nos. 868,587, filed Jan. 11, 1978, and 27,347, filed Apr. 5, 1979, are directed to an improved automatic clutch which meets this need. The clutch includes a mechanism for developing frictional drag to effect clutch engagement. The mechanism incorporates a wrapped spring characterized as having relatively high resistance to slippage in the spring-tightening or wrapping direction, and relatively low resistance to slippage in the spring-loosening or unwrapping direction. Upon initial rotation of the driving member, the spring is caused to tighten, thereby effecting clutch engagement. Thereafter, the spring is caused to loosen, thereby reducing frictional drag to a minimum. The improved clutch also includes an actuating mechanism which subjects a movable clutching sleeve to a preload. In the event clutch engagement is blocked, the actuating mechanism can complete its cycle of operation. When the blockage is relieved, the preloaded clutching sleeve completes clutch engagement. This clutch further includes a restraining device which creates high resistance to movement of the movable clutching sleeve. This resistance is effective only during initial rotation of the driving member, thus negating the effect of any spurious force which might tend to rotate the driving member.

U.S. application Ser. No. 66,720 filed Aug. 15, 1979, is directed to an automatic clutch which provides another type of frictional drive mechanism for automatically effecting clutch engagement, and for relieving the frictional drive force thereafter.

There remains a need in the art for an alternative automatic clutch for use in effecting and maintaining engagement between a drive axle and a wheel of a four-wheel drive vehicle upon the application of power to the drive axle. Such an alternative clutch should automatically effect disengagment upon cessation of the application of power to the drive axle, together with a direction reversal.

SUMMARY OF THE INVENTION

This invention is directed to such an alternative automatic clutch. The invention discloses an automatic clutch for automatically effecting engagement between driving and driven members in response to rotation of the driving member. The clutch maintains engagement between the members so long as the driving member is subject to rotation, and disengages automatically upon slight relative rotation of the members when the driving member is no longer subject to rotation. The clutch of the present invention is adapted for use in four-wheel drive vehicles where it is desirable to provide automatic engagement of, for example, the front wheels when the operator shifts into four-wheel drive, and automatic disengagement when the operator shifts out of four-wheel drive and reverses direction slightly.

The clutch of this invention includes a movable clutching element associated with a driving member, and a fixed clutching element associated with a driven member. The movable clutching element is moved into engagement with the fixed clutching element upon rotation of the driving member. Disengagement is prevented even in the event of a tendency for the driven member to overrun the driving member. As a result, a positive locking relationship is maintained in the drive and coast modes of operation as well as during the transition between drive and coast. Furthermore, the arrangement is such that this relationship also is maintained in the forward and reverse modes of operation.

The clutch of this invention also includes an alternative mechanism for developing a driving force to cause movement of the movable clutching element. The mechanism incorporates an actuating member which is rotatable with the driving member. Means are provided which tend to retard rotation of the actuating member, thereby moving it relative to the driving member in such a manner as to preload the clutch for clutch engagement. Rotation of the driving member in the opposite direction causes a reversal of this effect, disengaging the clutch. Continued rotation in the opposite direction then preloads the clutch for reverse clutch engagement.

BRIEF DESCRIPTION OF THE DRAWING

The objects and advantages of this invention will become apparent to those skilled in the art upon careful consideration of the specification herein, including the drawing, which is a sectional view showing details of the improved automatic clutch in its disengaged position.

While this invention is susceptible of embodiment in many different forms, there is shown in the drawing and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring to the drawing in greater detail, there is shown a rotatable driving member 10, which in one form of the invention may be an axle of a four-wheel drive vehicle. Axle 10 is rotatably supported in a stationary member 12, which may be a conventional axle housing. A rotatable driven member 14, which may be a wheel hub, is supported by a suitable bearing 16 for rotation about housing 12. Suitable lock nuts 18 secure bearing 16 in the usual manner. Axle 10 extends outwardly beyond housing 12, and is enclosed by a cover 20 which abuts the outer end of wheel hub 14.

A driving member 22 in the form of a suitable sleeve or the like is splined or otherwise secured to axle 10 for rotation therewith. A retainer 24 is secured to the outer end of sleeve 22. Sleeve 22 defines a straight, axial spline 26 and a helical spline 28 in the form of coarse screw threads or the like.

A first clutch element 30 is supported on straight spline 26 of sleeve 22 for rotation therewith and axial sliding movement relative thereto between limits established by suitable snap rings 32 and 34 or the like. Clutch element 30 defines a first set of clutch teeth 36.

A second clutch element 38 is splined or otherwise secured to wheel hub 14 for rotation therewith. Clutch element 38 defines suitable means for holding end cover 20 in place. Clutch element 38 also defines spaced second sets of clutch teeth 40 and 42.

An actuating member 44 is supported on helical spline 28 of sleeve 22 for rotation therewith and axial sliding movement relative thereto between limits established by snap ring 34 and another suitable snap ring 46 or the like. Actuating member 44 defines an inner annular surface 48.

An annular retaining member 50 is secured to housing 12 by lock nuts 18. Member 50 retains at least one suitable rolling element 52 in frictional contact with surface 48 of actuator 44.

A first biasing spring 54 or the like is interposed between retainer 24 and clutch element 30, and is secured thereto. Similarly, a second biasing spring 56 or the like is interposed between clutch element 30 and actuator 44, and is secured thereto. Springs 54,56 exert opposing biasing forces on clutch element 30, tending to maintain it in an intermediate position between retainer 24 and actuator 44.

As shown in the drawing, actuator 44 is in an intermediate position on helical spline 28. Correspondingly, clutch element 30 is in an intermediate position on straight spline 26, with teeth 36 between teeth 40,42 of clutch element 38. In this first, intermediate position, the clutch is disengaged and an associated vehicle would be operating in the two-wheel drive mode. In a preferred form of the invention, springs 54,56 are unstressed in this position.

When the operator engages four-wheel drive, he subjects axle 10 to rotation under power. Sleeve 22, clutch element 30 and actuator 44 rotate with axle 10. The frictional contact of rolling element 52 with surface 48 develops a frictional drag force tending to retard rotation of actuator 44. As a result, actuator 44 will thread along helical spline 28, thereby moving axially relative to sleeve 22. Assuming that forward rotation of axle 10 results in leftward movement of actuator 44, springs 54, 56 will be stressed in compression, and clutch element 30 will be moved leftwardly relative to sleeve 22 along straight spline 26 until teeth 36 are in alignment with teeth 40. Should this sliding movement of clutch element 30 be blocked, compression of springs 54,56 will become unbalanced, thereby preloading element 30. Upon slight relative rotation between teeth 36,40, this blockage will be cleared and the sliding movement of element 30 will be completed. At this point, the biasing forces of springs 54,56 again are balanced with element 30 abutting limit stop 32 and teeth 36,40 in alignment. In addition, spring 56 is stressed helically, thereby tending to bias actuator 44 for return to its intermediate position on helical spline 28.

In a preferred form of the invention, rolling element 52 is in the form of a bearing ring rotatable about the axis of axle 10. This configuration develops rolling friction acting upon actuator 44 as it rotates with axle 10 and sleeve 22. In addition, this configuration develops sliding friction acting upon actuator 44 as it moves axially relative to sleeve 22. When actuator 44 has reached the limit of its axial movement, rolling element 52 develops only rolling friction tending to maintain actuator 44 in this position.

Thus, it is apparent that relatively high rolling and sliding frictional drag forces act upon actuator 44 until the clutch is engaged, and that only relatively low rolling frictional drag forces act upon actuator 44 thereafter to maintain the clutch in engagement.

If desired, rolling element 52 could be in the form of a plurality of rollers, each rotatable on its own axis. Alternatively, a suitable frictional biasing mechanism might be that disclosed in the aforementioned U.S. applications Ser. Nos. 868,587 and 27,347. Should clutch design not require the development of sliding friction, rolling element 52 might be replaced with suitable balls or the like.

In any event, after clutch engagement the frictional drag forces developed between rolling element 52 and actuator 44 are relatively low, with the result that there is very little energy loss, heat build-up, etc.

At this point, teeth 36,40 are in alignment and positive engagement is established between axle 10 and wheel hub 14 in the drive mode. When the vehicle shifts from drive to coast, as for example when the operator lifts his foot off of the accelerator, hub 14 tends to overrun axle 10. In effect an engine braking condition is established, and hub 14 drives axle 10. This will have no effect on the position of clutch element 30 due to the axial orientation of straight spline 26. So long as axle 10 is rotating in the forward direction, actuator 44 will tend to remain in its leftward position. The vehicle may shift back and forth between drive and coast, but teeth 36,40 will remain in alignment, thus insuring that four-wheel drive operation is maintained.

When the operator desires to move in reverse, he stops the vehicle, shifts the transmission into reverse, and then starts the vehicle once again, all the while remaining engaged in four-wheel drive. The frictional drag forces developed by rolling element 52 cause movement of actuator 44 to the right into abuttment with limit stop 46. This stresses springs 54,56 in tension, causing clutch element 30 to slide along straight spline 26 into abuttment with limit stop 34. In this position, teeth 36,42 are in alignment, and the clutch once again is positively engaged for four-wheel drive operation.

An important advantage of the arrangement disclosed herein is that a positive drive condition is maintained in both the drive and coast modes, either in forward or reverse. This positive drive is established automatically, thereby eliminating any need for manually locking the wheel hubs.

When the operator desires to establish two-wheel drive, he stops the vehicle and disengages four-wheel drive. Axle 10 is no longer subject to rotation under power. The operator moves the vehicle in the opposite direction slightly, so as to relieve any possible windup in either teeth 36,40 or teeth 36,42. Springs 54,56 will return from a stressed condition in either compression or tension to the unstressed condition shown in the drawing. This return will move clutch element 30 to its intermediate, disengaged position, and will move actuator 44 toward its intermediate, disengaged position. In addition, relief of the helical stress in spring 56 also will move actuator 44 toward its disengaged position. Upon clutch disengagement, the operator may proceed in either direction in two-wheel drive.

Thus, it will be seen that positive drive is established automatically when four-wheel drive is engaged. The automatic feature eliminates any necessity for manual lockup. Positive drive in maintained in either the drive or coast mode, and during the transition between drive and coast. Similarly, positive drive is maintained in either the forward or reverse mode.

It is apparent that although the invention provides a novel arrangement for clutching the drive axle and its associated wheels in a four-wheel drive vehicle, it is readily available for use in any environment where automatic clutching between driving and driven members is desired.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. An automatic clutch for effecting engagement between rotatable driving and driven members in response to rotation of said driving member, said driving member including means defining straight and helical splines, said clutch comprising first and second clutching means respectively rotatable with said driving and driven members, said first clutching means being axially movable relative to said driving member to first and second positions respectively out of and in clutching engagement with said second clutching means, said first clutching means being guided in its axial movement by said straight spline, means biasing said first clutching means for axial movement to its first position in the absence of rotation of said driving member, and means for moving said first clutching means axially to its second position, said moving means including an actuator rotatable with and axially movable relative to said driving member, said actuator being guided in its axial movement by said helical spline, means tending to retard rotation of said actuator thereby effecting said axial movement of said actuator relative to said driving member, and means coupling said actuator with said first clutching means for effecting said axial movement of said first clutching means to its second position in response to said axial movement of said actuator.

2. The invention of claim 1, said first clutching means being axially movable relative to said driving member to a third position in clutching engagement with said second clutching means, said moving means being effective for moving said first clutching means to its second and third positions with axial movement of said actuator being in one direction upon rotation of said driving member in one direction and in the opposite direction upon rotation of said driving member in the opposite direction, and said coupling means being effective for moving said first clutching means to its second and third positions respectively in response to said movement of said actuator in said one and opposite directions.

3. The invention of claim 2, said first position being between said second and third positions.

4. The invention of claim 3, said biasing and coupling means together including resilient means for exerting opposing forces on said first clutching means and for exerting a force on said actuator.

5. The invention of claim 5, said biasing and coupling means being spring means which are unstressed when said first clutching means is in its first position, stressed in compression and helically in one direction when said first clutching means is in its second position, and stressed in tension and helically in the opposite direction when said first clutching means is in its third position.

6. The invention of claim 5, said spring means being a first spring interposed between said driving member and said first clutching means and a second spring interposed between said first clutching means and said actuator.

7. The invention of claims 1, 2, 3, 4, 5 or 6, said rotation retarding means including rolling means in frictional engagement with said actuator.

8. The invention of claim 1, 2, 3, 4, 5 or 6, said rotation retarding means including rolling means in frictional engagement with said actuator, said rolling means being axially elongated thereby developing a rolling frictional force tending to retard rotation of said actuator and a sliding frictional force tending to retard axial movement of said actuator.

* * * * *